(12) United States Patent
Bhorkar et al.

(10) Patent No.: US 11,204,853 B2
(45) Date of Patent: Dec. 21, 2021

(54) SYSTEM AND METHOD FOR LOW LATENCY EDGE COMPUTING

(71) Applicant: AT&T Intellectual Property I, L.P., Atlanta, GA (US)

(72) Inventors: Abhijeet Bhorkar, Fremont, CA (US); Mehdi Malboubi, San Ramon, CA (US); Baofeng Jiang, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 381 days.

(21) Appl. No.: 16/416,730

(22) Filed: May 20, 2019

(65) Prior Publication Data

US 2020/0371893 A1 Nov. 26, 2020

(51) Int. Cl.
| | |
|---|---|
| *G06F 11/34* | (2006.01) |
| *G06F 11/30* | (2006.01) |
| *G06F 9/50* | (2006.01) |
| *H04L 12/26* | (2006.01) |
| *G06F 9/54* | (2006.01) |

(52) U.S. Cl.
CPC ........ *G06F 11/3419* (2013.01); *G06F 9/5044* (2013.01); *G06F 9/5072* (2013.01); *G06F 9/54* (2013.01); *G06F 11/3006* (2013.01); *H04L 43/0817* (2013.01); *H04L 43/0852* (2013.01)

(58) Field of Classification Search
USPC ...................................................... 709/224
See application file for complete search history.

(56) References Cited

U.S. PATENT DOCUMENTS

| | | | |
|---|---|---|---|
| 2013/0094400 A1* | 4/2013 | Anthony, Jr. | H04L 41/14 370/254 |
| 2015/0295638 A1* | 10/2015 | Keremedjiev | H04W 36/32 455/13.1 |
| 2018/0349168 A1* | 12/2018 | Ahmed | G06F 11/3452 |
| 2020/0322836 A1* | 10/2020 | Lekutai | H04W 28/0284 |

\* cited by examiner

*Primary Examiner* — Hermon Asres
(74) *Attorney, Agent, or Firm* — Guntin & Gust, PLC; Dana Lemoine

(57) ABSTRACT

Aspects of the subject disclosure may include, for example, a method in which a processing system receives data at an edge node of a network that also includes regional nodes and central nodes. The processing system also determines a latency criterion associated with an application for processing the data; the application corresponds to an application programming interface. The method also includes processing the data in accordance with the application, monitoring a latency associated with the processing, and determining whether the latency meets the latency criterion. The processing system dynamically assigns data processing resources so that the latency meets the latency criterion; the resources include computation, network and storage resources of the edge node, a central node, and a regional node in communication with the edge node and the central node. Other embodiments are disclosed.

20 Claims, 15 Drawing Sheets

202

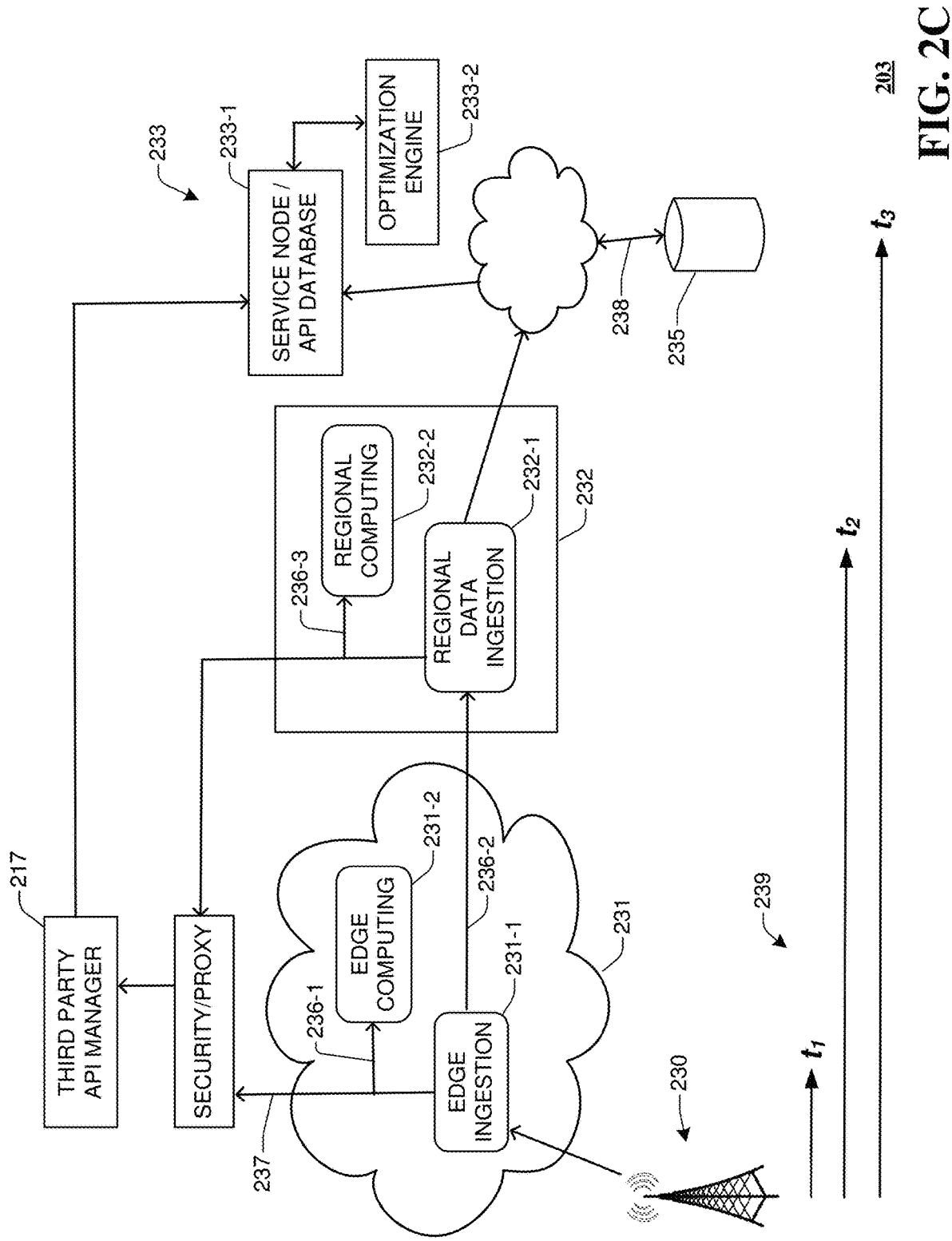

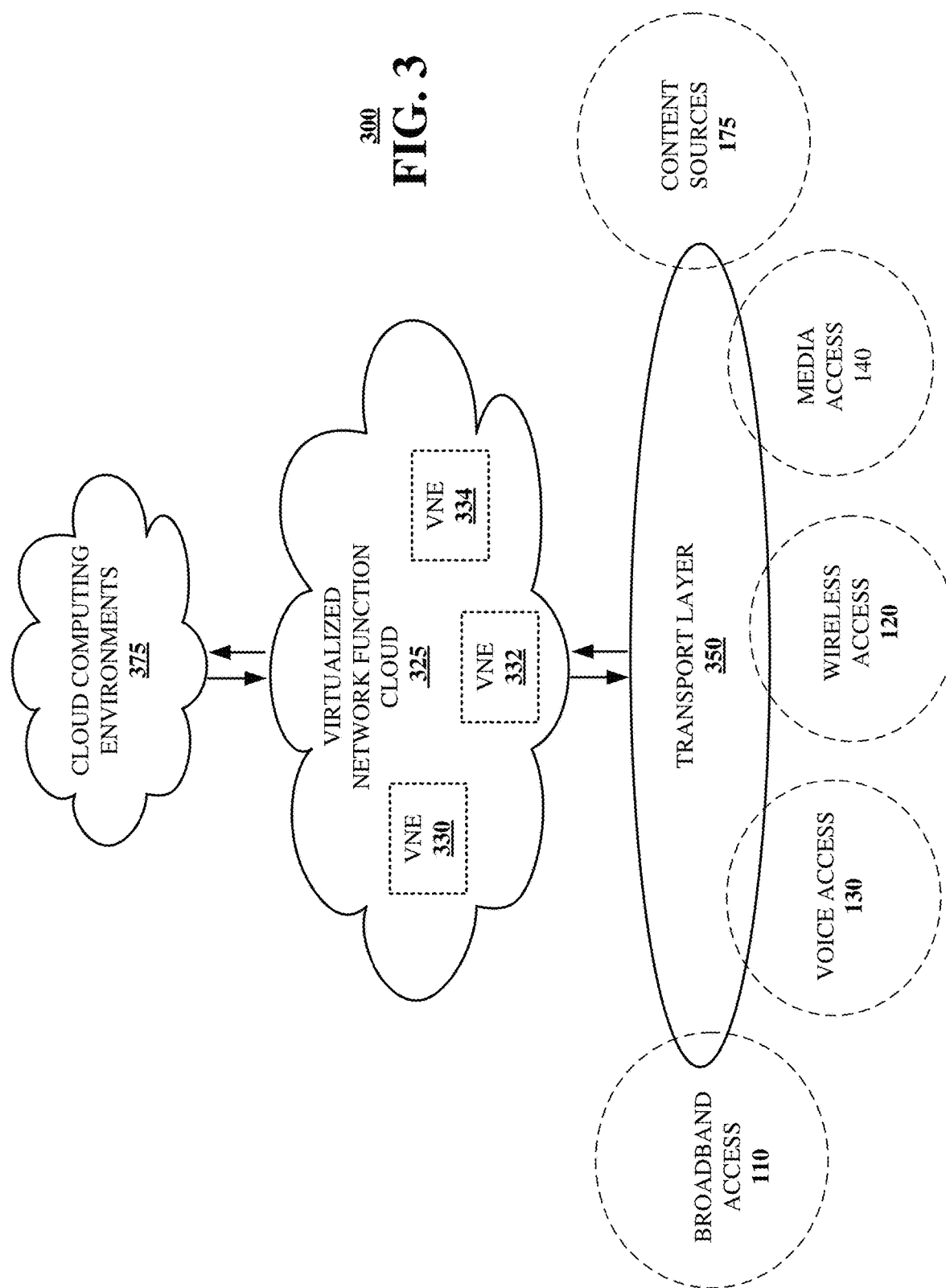

SYSTEM AND METHOD FOR LOW LATENCY EDGE COMPUTING

FIELD OF THE DISCLOSURE

The subject disclosure relates to a system and method for low latency computing, and more particularly to a distributed system including edge computing, regional computing and central computing that enables low latency computing.

BACKGROUND

Next-generation applications, powered by advances in machine learning, autonomous vehicles, and virtual and augmented reality, will in many cases require near-real-time responses from computing systems. Computing power may be deployed at network edges, i.e. in data centers of relatively small capacity, scattered in and around a populated area, in a distributed computing architecture (referred to herein as an edge network or fog network).

BRIEF DESCRIPTION OF THE DRAWINGS

Reference will now be made to the accompanying drawings, which are not necessarily drawn to scale, and wherein:

FIG. 2C schematically illustrates a computing architecture and latency times associated with various network nodes, in accordance with embodiments of the disclosure.

FIG. 3 is a block diagram illustrating an example, non-limiting embodiment of a virtualized communication network in accordance with various aspects described herein.

DETAILED DESCRIPTION

Figure 1:
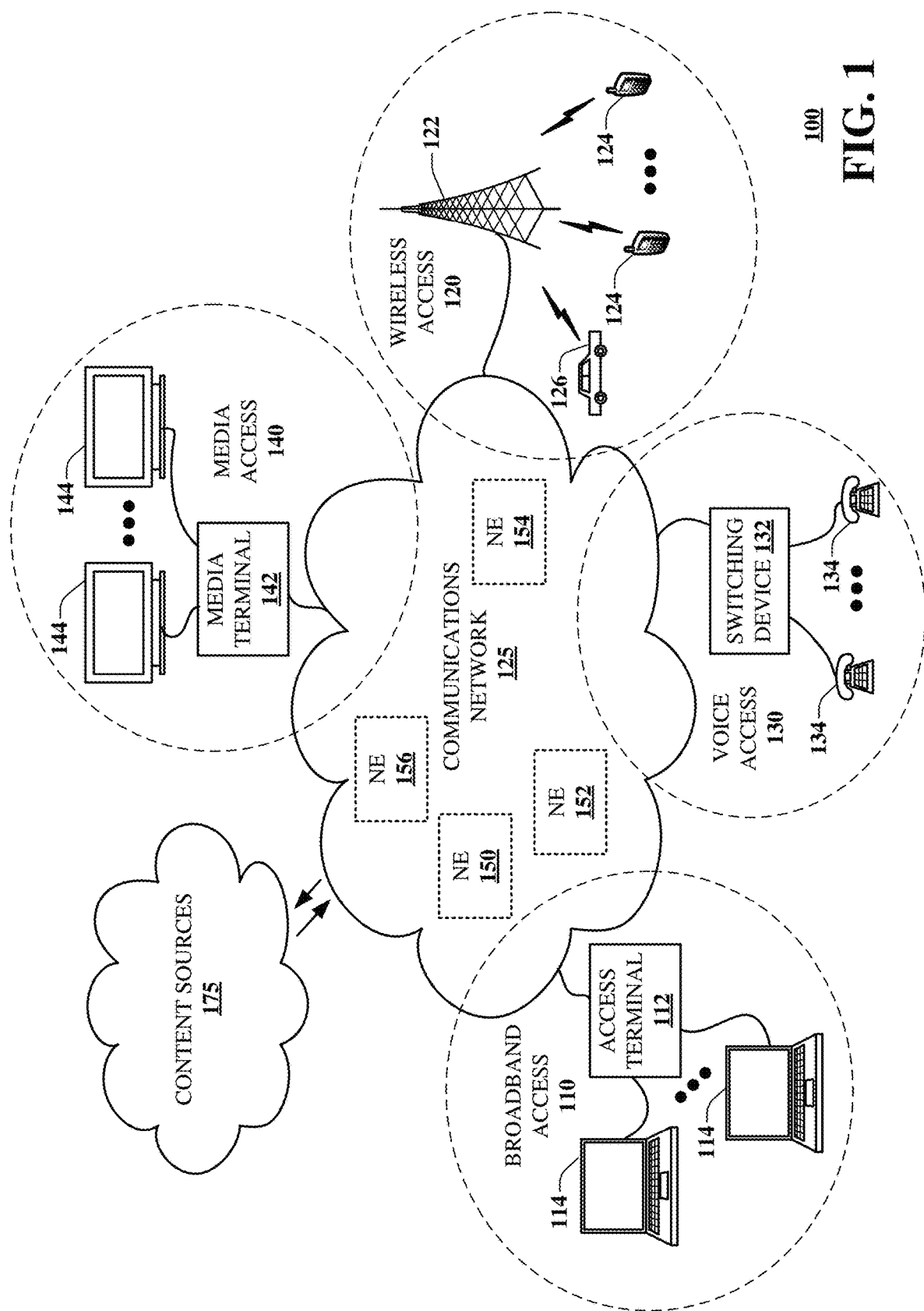
FIG. 1 is a block diagram illustrating an exemplary, non-limiting embodiment of a communications network in accordance with various aspects described herein.

The subject disclosure describes, among other things, illustrative embodiments of a distributed computing architecture that enables low latency computing. Other embodiments are described in the subject disclosure.

One or more aspects of the subject disclosure include a method comprising receiving, by a processing system including a processor, data at an edge node of a plurality of edge nodes of a network; the network includes a plurality of regional nodes and a plurality of central nodes. (As is understood in the art, the network typically includes other network elements and devices and can communicate with user equipment.) The method also comprises determining a latency criterion associated with an application for processing the data; the application utilizes an application programming interface (API) included in a database accessible to a central node of the plurality of central nodes. (In various embodiments, the API can be accessible to edge nodes and regional nodes, and portions of the API can be accessible to users of the application, who may, for example, be subscribers to the network.) The method also comprises monitoring a latency associated with processing the data by the application, and determining whether the latency satisfies the latency criterion. The method further comprises assigning resources to assist the application in reducing the latency associated with the processing of the data, in response to the latency satisfying the latency criterion; the resources comprise computation resources, storage resources, network resources or a combination of those resources obtained from the central node, the edge node, a regional node of the plurality of regional nodes in communication with the edge node and the central node, or a combination of those nodes.

One or more aspects of the subject disclosure include a device comprising a processing system and a memory storing executable instructions that, when executed by the processing system, facilitate performance of operations. The operations comprise receiving data at an edge node of a plurality of edge nodes of a network; the network includes a plurality of regional nodes and a plurality of central nodes. The operations also comprise determining a latency criterion associated with an application for processing the data; the application utilizes an application programming interface (API) included in a database accessible to a central node of the plurality of central nodes (and can also be accessible to edge and regional nodes and to users, as noted above). The operations also comprise measuring and/or accessing a key performance indicator (KPI) of the network, monitoring a latency associated with processing the data by the application, and determining whether the latency satisfies the latency criterion. The operations further comprise assigning resources to assist the application in reducing the latency associated with the processing of the data, in response to the latency satisfying the latency criterion; the resources comprise computation resources, network resources, storage resources or a combination of those resources obtained from the central node, the edge node, a regional node of the plurality of regional nodes in communication with the edge node and the central node, or a combination of those nodes.

One or more aspects of the subject disclosure include a machine-readable medium comprising executable instructions that, when executed by a processing system including a processor, facilitate performance of operations. The operations comprise receiving data at an edge node of a plurality of edge nodes of a network; the network includes a plurality of regional nodes and a plurality of central nodes. The operations also comprise determining a latency criterion associated with an application for processing the data; the application utilizes an application programming interface (API) included in a database accessible to a central node of the plurality of central nodes, the API comprises a plurality of base APIs, and the database includes a list of data objects to be accessed by the respective base APIs. The operations also comprise monitoring a latency associated with processing the data by the application, and determining whether the latency satisfies the latency criterion. The operations further comprise assigning resources to assist the application in reducing the latency associated with the processing of the data, in response to the latency satisfying the latency criterion; the resources comprise computation resources, storage resources, network resources or a combination of those resources obtained from the central node, the edge node, a regional node of the plurality of regional nodes in communication with the edge node and the central node, or a combination of those nodes.

Referring now to FIG. 1, a block diagram is shown illustrating an example, non-limiting embodiment of a communications network 100 in accordance with various aspects described herein. For example, network 100 can facilitate in whole or in part communications between edge nodes, regional nodes, and central nodes to enable low-latency computing. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
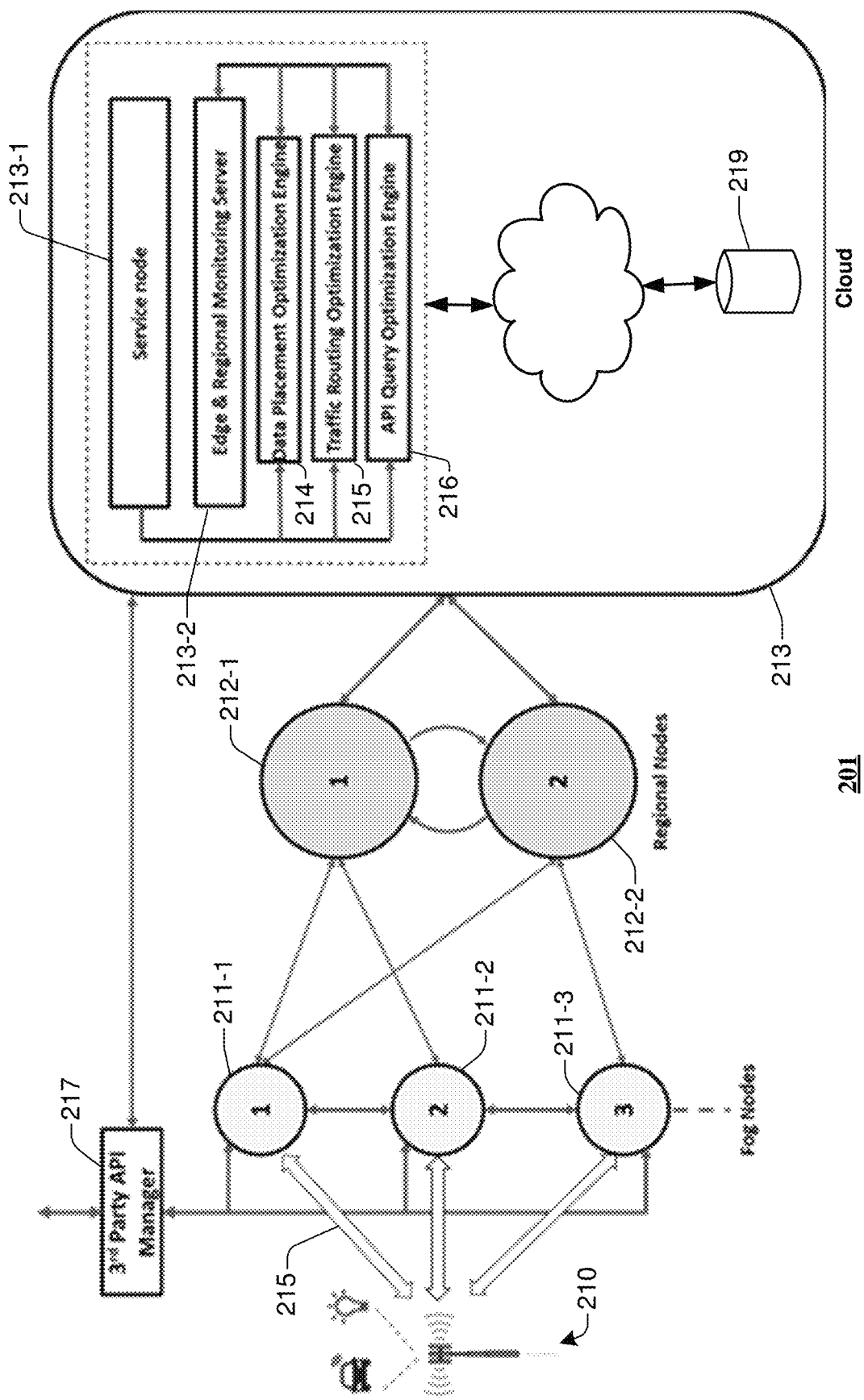
FIG. 2A is a block diagram illustrating an example, non-limiting embodiment of a system functioning within the communication network of FIG. 1 and including fog nodes and regional nodes communicating with a cloud network, in accordance with various aspects described herein.

FIG. 2A is a block diagram illustrating an example, non-limiting embodiment of a system 201 functioning within the communication network of FIG. 1 in accordance with various aspects described herein. As shown in FIG. 2A, a low-latency network architecture includes network edge nodes 211-1, 211-2, 211-3 (also referred to herein as fog nodes) receiving data 215 from various devices 210 (for example, sensors included in the "Internet of things" or IoT); such devices are generally referred to herein as edge devices. Regional nodes 212-1, 212-2 receive and process data from the fog nodes, and communicate with a central node 213 of the cloud.

The fog node(s) may process the data ingested from the edge devices according to a low-latency application, to provide a real-time response (that is, a response within approximately 10 msec) depending on the application requirements. The fog node is advantageously located close to the source of the data.

In an embodiment, the fog nodes may utilize streaming frameworks (e.g., Apache Storm, Apache Flink, Spark). In a further embodiment, the fog nodes stream data (either processed or unprocessed) toward the regional nodes using a stream processing platform (e.g. Kafka).

In another embodiment, the fog nodes are configured to forward the data to third-party applications; for example, via a third-party application programming interface (API) manager 217. The third-party API manager provides a gatekeeping function for transferring data to the third party. In this embodiment, a third party can have access to the edge device data 215 with very low latency relative to access by routing through a core network.

The regional nodes 212-1, 212-2 include processors for analyzing the data received from the fog nodes. In an embodiment, the regional processors can also incorporate complementary data from the cloud when performing this analysis. In another embodiment, the regional nodes receive data as it is ingested by the fog nodes; data forwarded to the cloud by the regional nodes may thus be either processed or unprocessed.

Figure 2B:
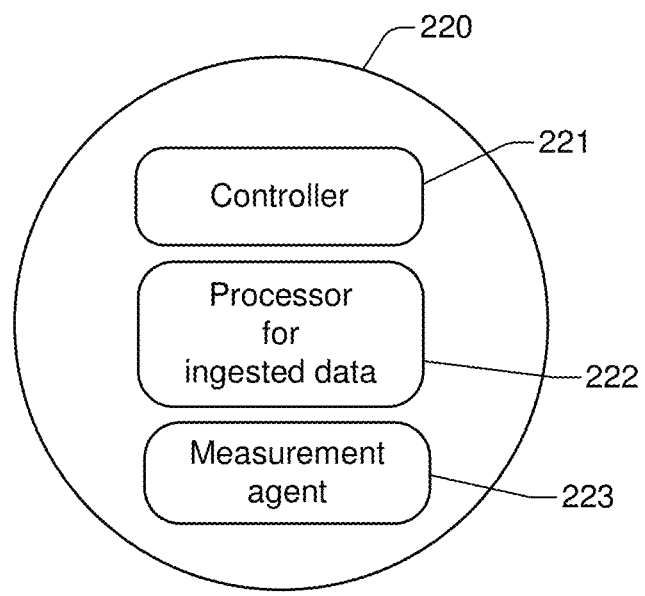
FIG. 2B schematically illustrates components of a regional network node, in accordance with embodiments of the disclosure.

FIG. 2B is a schematic illustration 202 of components of a regional node 220: controller 221, processor 222, and measurement agent 223. Regional controller 221 manages the node in coordination with the fog nodes and the cloud. Processor 222 analyzes data from the edge devices, with a higher latency compared to the fog nodes. The regional measurement agent 223 measures latencies between the fog nodes, regional node, and the cloud. In an embodiment, the measurement agent measures other key performance indicators (KPIs) of the network (e.g., data flow size, data flow rate, data loss rate) in addition to, or instead of, latency of the regional node. In an embodiment, the measurement agent 223 forms part of a measurement network for measuring KPIs between the network edge and the cloud.

Referring again to FIG. 2A, the cloud (represented as a central node 213) includes a service node 213-1 and a monitoring server 213-2. The cloud may perform additional processing on the data received from the regional nodes; this processing is generally not in real time. In an embodiment, data at the cloud is formatted as files and stored in storage device 219.

In an embodiment, service node 213-1 communicates with the edge devices and maintains a list of available services. The list of available services may include descriptions of the services, latency requirements, and other quality of service (QoS) parameters associated with the services. In an embodiment, the service node provides a service repository API that can be used by either edge devices or third-party applications. In a further embodiment, the API can be utilized by optimization services including a data placement optimization engine 214, a traffic routing optimization engine 215, and a API query optimization engine 216.

The edge and regional monitoring server 213-2 records data relating to the health of the edge and regional nodes. In an embodiment, the monitoring server stores inter-node and intra-node latencies for the fog nodes and the regional nodes.

The monitoring server can measure the latency for each API for each network user. In an embodiment, the monitoring server monitors latencies and other KPIs between edge nodes, regional nodes, and the cloud. In an further embodiment, the monitoring server 213-2 controls measurement agents 223 in the regional nodes and measurement agents in the fog nodes.

FIG. 2C is a schematic illustration 203 of a computing architecture and latency times associated with various network nodes, in accordance with embodiments of the disclosure. As shown in FIG. 2C, streaming technologies may be used at the fog nodes and regional nodes. In this embodiment, data is streamed from the edge data ingestion component 231-1 of fog node 231 to the computing component 231-2 of the fog node, and from the regional data ingestion component 232-1 of regional node 232 to the computing component 232-2 of regional node 232.

In this embodiment, the edge data ingestion component 231-1 collects real-time user session event data from network nodes (e.g., eNodeBs, CU, DU, MMEs) and from user equipment (UE) at the fog nodes. Data from UEs may be transmitted to the fog nodes via a cellular base station 230. A variety of functions may thus be enabled, for example: near real-time network problem isolation and trouble-shooting, cell boundary detection, geo-tagging and closed-loop RAN management and optimization. In particular, streamed data 236-1 can support latency-sensitive business applications. As shown in FIG. 2C, data can be ingested and processed at the fog node with a relatively short latency time $t_1$. The edge data ingestion component 231-1 may also stream data 237 to third party real time applications.

Regional node 232 may also receive output streams 236-2 from the edge data ingestion component of fog node 231. In an embodiment, the regional data ingestion component 232-1 pre-processes the streaming data received, and streams the processed data 236-3 as output. The regional data ingestion component 232-1 may also output data 238 as files which can be consumed by downstream applications that are insensitive to data latency, and can be stored in file-based storage 235.

The service node 233-1 and optimization engine 233-2 of central node 233 are enabled to meet service level agreements (SLAs) regarding latency or other KPIs. In this embodiment, the service node 233-1 includes an API database containing information regarding various supported APIs and service level agreements (SLAs). In general, each application has a latency requirement and SLA associated therewith; the SLA specifies quality of service (QoS) requirements. The optimization engine 233-2 determines whether that SLA is being met, and enforces the SLA by optimizing placement of base applications, placement of data, and routing of network traffic. In an embodiment, the optimization engine 233-2 predicts whether the SLA for an application will be met, based on the latency achieved for the application.

FIG. 2C also shows relative latencies 239 for data processing at the fog node, regional node and central node. In this embodiment, latency time $t_1$ can be on the order of milliseconds for processing at the fog node 231 (sometimes referred to as near-real-time), while latency time $t_2$ can be on the order of seconds for processing at the regional node 232, and latency time $t_3$ can be on the order of minutes for processing at the central node 233.

Figure 2D:
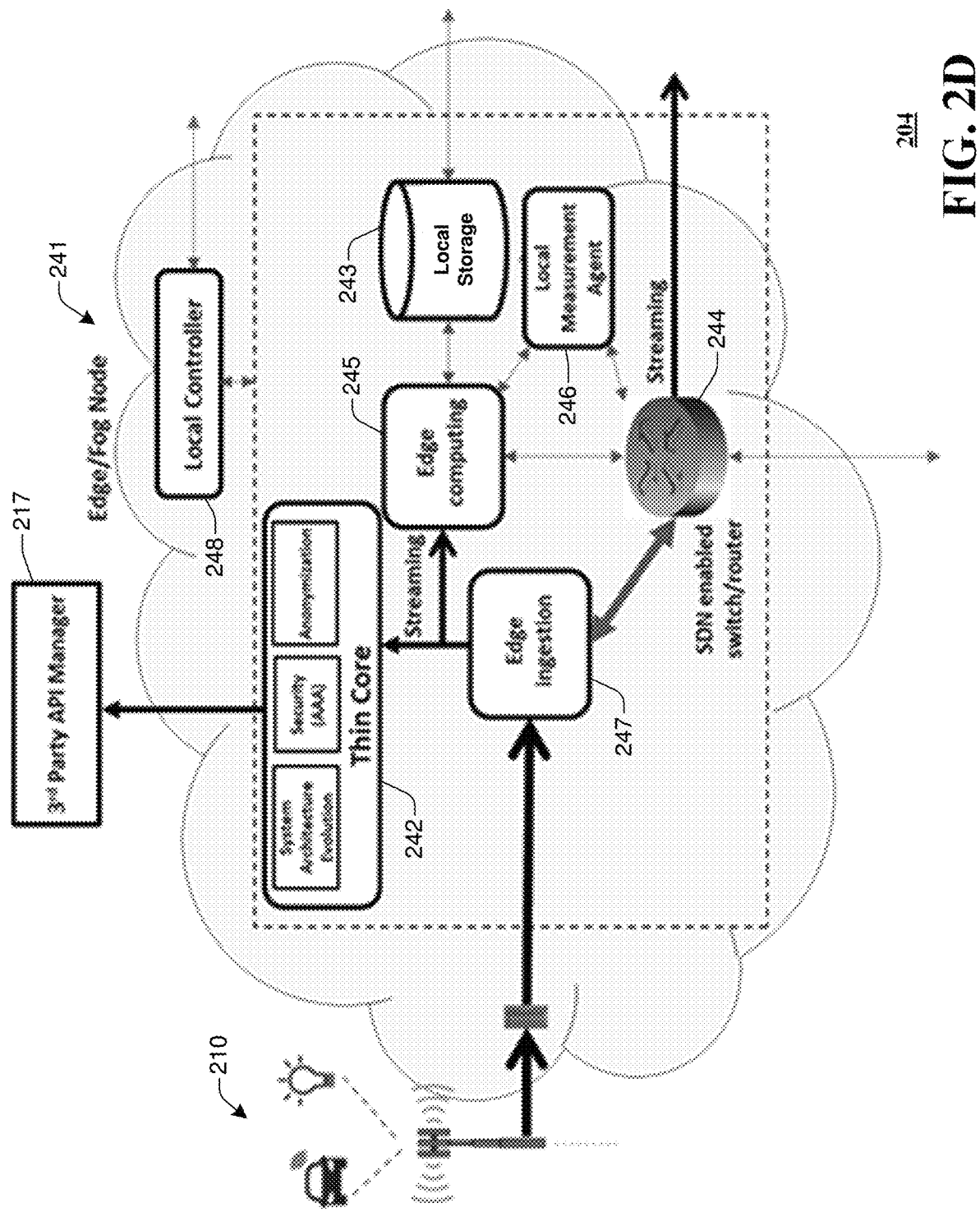
FIG. 2D schematically illustrates a fog node of a low latency network in accordance with embodiments of the disclosure.

FIG. 2D is a schematic illustration 204 of a fog node 241 of a low latency network in accordance with embodiments of the disclosure. In this embodiment, the fog node includes a thin core processing system 242 has an SAE (service architecture evolution) node that performs functions of a gateway, e.g., a service gateway (S-GW) and/or a packet data network gateway (P-GW). The data collected at the edge can be tunneled via the SAE to a third party. The thin core also provides security and data anonymization engines for security and preserving privacy.

In an embodiment, the third-party API manager 217 provides a list of APIs that a third party can use to access edge data. Data may be directly forwarded to the third party in accordance with the access point name (APN) of the data. In a further embodiment, the API manager may request processing of the ingested data before it is forwarded to the third party.

The fog node may include local complementary storage 243. In an embodiment, storage 243 contains information required for applying decentralized machine-learning/artificial-intelligence (ML/AI) algorithms from neighboring nodes. Such information can be used in delay-sensitive applications, e.g. safety applications for autonomous vehicles.

In this embodiment, the fog node also includes a software-defined network (SDN) enabled router 244 and/or an SDN enabled switch. Router 244 facilitates communication between the fog nodes and regional nodes, and can adaptively control traffic flow; in particular, router 244 may route information over different routes so that data transmission latency is minimized. More generally, SDN capability at the fog node can enable creation of a specific channel for sharing local awareness between fog nodes. In an embodiment, a fog node using this channel can share local measurements and any other information (e.g. resource usages, number of devices observed, etc.) that other nodes may require for making a decision. For example, if a fog node is busy with computations, other nodes may temporarily avoid asking that node for any additional processing.

The edge computing unit 245 is the main local processing unit of node 241 and performs various functions including, for example, data analysis, data encoding and decoding, and applying algorithms for efficient data processing.

In this embodiment, a local measurement agent 246 communicates with computing unit 245. The local measurement agent can measure latencies and/or other KPIs between fog nodes, regional nodes, and the cloud.

The edge ingestion unit 247 ingests real-time data from the edge devices. In an embodiment, the edge ingestion unit includes a processor and a memory for data filtering and/or data encoding or decoding.

In this embodiment, the fog node also includes a local controller 248 that applies control messages received from regional controllers (or derives control decisions) to manage the components of the fog node. For example, if memory is limited in the fog node, the local controller can configure the SDN router to send delay-sensitive information to the closest fog node or regional node for storage. The local controller can allocate resources to minimize processing delays and local power consumption. In an embodiment, the local controller can also manage data anonymization. In a further embodiment, the local controller can control the local measurement agent to ensure performance of measurement tasks.

To reduce overall latency, it is desirable to: (1) reduce required computations; (2) place data as close as possible to computing components, and (3) reduce communication latencies between edge nodes, regional nodes, and the cloud. In various embodiments, the service node 213-1 accordingly applies the following optimizations at the cloud:

API query optimization: To reduce the end-to-end processing latency, computations across multiple nearby edge and regional nodes can be minimized. Specifically, the service node runs an API query optimization engine 216 that analyzes the computation and provides a mapping between the sub-tasks that to be performed across multiple hosts from different edge, regional, and/or central nodes.

Data placement optimization: The data placement optimization engine 214 works with the API query optimization engine 216 to identify optimal locations for storing data that is required for performing decentralized processing with the lowest possible latency. In an embodiment, the data placement optimization engine determines, which part of the data stream is stored at which portion of the network (fog node, regional node, or central node).

Traffic routing optimization: The traffic routing optimization engine 215 performs data routing to minimize the data communication latency for each API registered at the service node called by an end device. Specifically, the engine 215 receives various communication and computation latencies among various nodes and determines how to avoid congested routes and loaded CPUs. This optimization is performed dynamically, per edge device and per API.

Figure 2E:
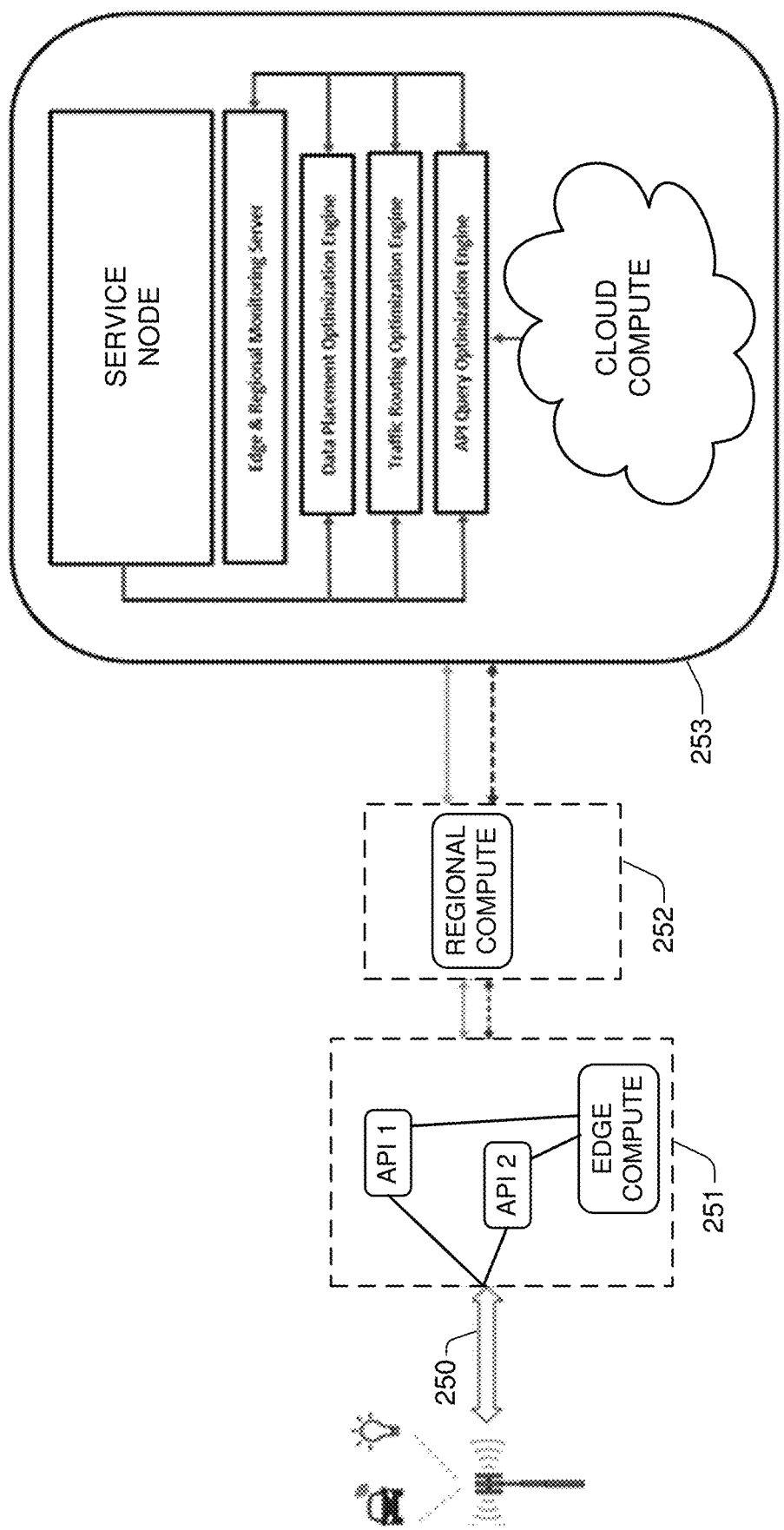
FIG. 2E illustrates an example of low latency edge computing using a network architecture according to embodiments of the disclosure.

FIG. 2E schematically illustrates a procedure 205 for applying optimization to minimize latency in two different applications. Based on the application, a data placement optimization engine (run by a service node of central node 253 in the cloud) optimally places the complementary data at edge and regional nodes 251, 252. These data are complementary to the real-time data 250 received from the edge devices. The local/regional data and the real-time data from the edge devices are required for applying decentralized processing with the lowest possible latency. Therefore, as soon as the edge-device data 250 is available, they can be jointly processed with the local complementary data at local nodes and provide the minimum latency analysis.

Based on current latency measurements (and measurements of other KPIs), the traffic routing optimization engine may configure two optimal routes: (1) a low latency route for forwarding packets of a low-latency application and (2) a high-latency route for forwarding packets of a high-latency application.

Figure 2F:
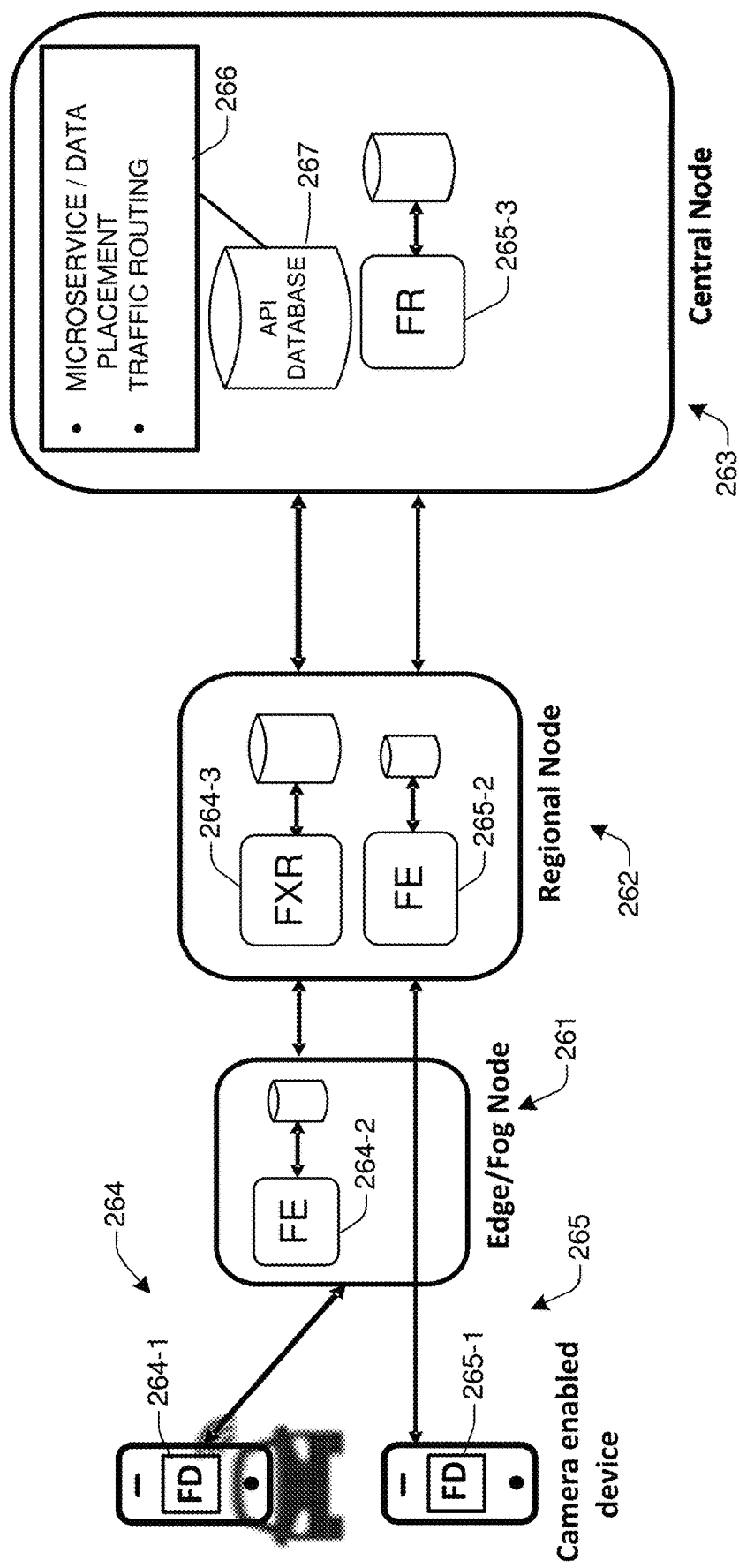
FIG. 2F illustrates data processing for a first application requiring relatively low-latency and a second application with higher latency, in accordance with an embodiment of the disclosure.

FIG. 2F illustrates a procedure 206 including data processing for a first application requiring relatively low latency and a second application with higher latency, in accordance with an embodiment of the disclosure. In the example shown in FIG. 2F, a face expression recognition (FXR) application 264 (in this embodiment, installed in a vehicle to detect drowsiness in the vehicle operator) is time sensitive and thus requires low latency, while a face recognition (FR) application 265 on a smart phone is less time-sensitive and thus can tolerate higher latency.

In this embodiment, a service node 266 of central node 263 includes a placement engine and a traffic routing engine. The placement engine partitions each application into three independent base applications, also referred to herein as microservices: (1) face detection (FD); (2) feature extraction (FE); and (3) face recognition (FR). The partitioning is discussed below with reference to FIG. 2G.

The placement engine places the FD microservice 264-1, 265-1, whose computation requirements are relatively low, at the user devices (in this example, vehicle and smart phone respectively). The FE and FR micro service, which are more computationally expensive and require more access to training data, are placed at the edge node 261, regional node 262 and central node 263. For the FXR vehicle application where low latency is required, the placement engine places the FE microservice 264-2 at the edge/fog node 261 and the FR microservice 264-3 at regional node 262, closer to the local real-time data than the FE and FR microservices 265-2, 265-3 of the higher-latency application. The traffic routing engine then configures optimal routes for placing data and facilitating communications.

In an embodiment, the API database 267 stores static information regarding each API (or application). The stored information may include (but is not limited to): (1) the type of API (simple, i.e. comprising one base API, or complex, i.e. comprising multiple base APIs); (2) how the API is to be decomposed into its base APIs; (3) a list of data objects to which the base APIs require access; (4) a list of allowed users of the API (possibly including a third-party user); (5) quality of service (QoS) requirements; (6) pointers to additional information associated with the base APIs. The additional information may include (but is not limited to): (a) policies restricting API placement (e.g., the API must be executed at an edge node); (b) policies restricting data placement; (c) computation complexity (e.g., a number of CPU cycles and/or a number of I/O cycles); (d) bandwidth requirement (e.g., an average bandwidth utilization by the API). In an embodiment, this information is obtained by simulating one or more executions of an application on various nodes of the network.

Figure 2G:
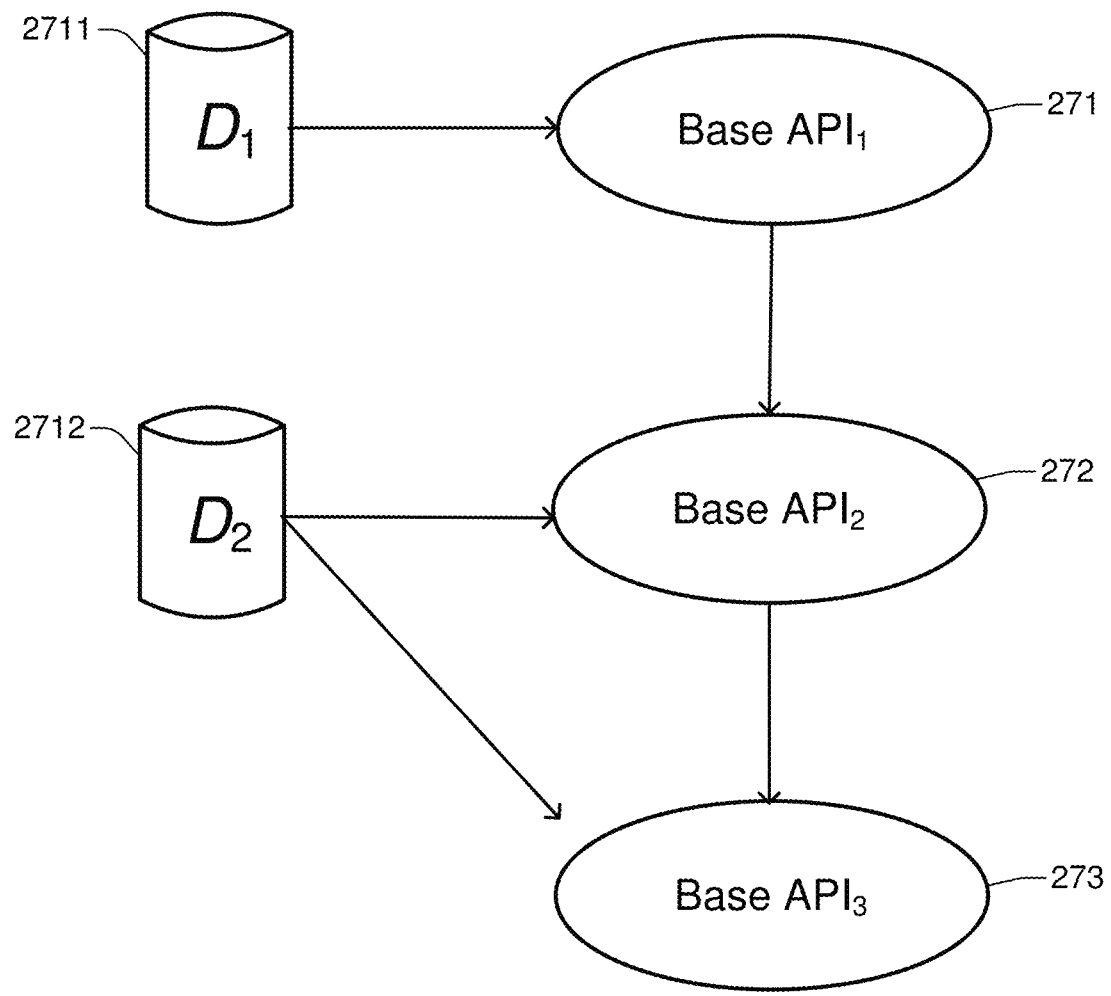
FIG. 2G schematically illustrates partitioning of an application programming interface (API) into a set of base APIs accessing a set of data objects.

FIG. 2G is a schematic illustration 207 of partitioning and measuring latency of an application programming interface (API). An API (or application) may be viewed as a set of base APIs (or base application functions). The overall latency of an API can be measured as a sum of latencies of the base APIs. In the example 207 shown in FIG. 2G, an API is decomposed into a set of base APIs 271-273: base $API_1$, base $API_2$, and base $API_3$. If the latency of $API_i$ is $L_i$, then the total latency is $\Sigma L_i$, assuming that each API in the set is called sequentially and that the input of $API_i$ depends on the output of $API_{i-1}$. As shown in FIG. 2G, the respective base APIs may access different sets 2711, 2712 of data objects, $D_1$ and $D_2$.

In the example of a face recognition application, there are three base APIs: face detection, feature extraction, and face recognition. In an embodiment, video of a user's face is transmitted to an edge node; the edge node performs face detection and then performs feature extraction. The edge node can then transfer the feature to a database that compares the extracted feature with a known feature, and returns the closest match. The database may be stored at the regional node or at the central node, depending on the end-to-end latency requirements for the application. In this embodiment, the optimization engine determines whether the feature extraction and database search should be performed at the edge node, regional node, or central node, so that the end-to-end latency (that is, time from the video transmission to face recognition of the user) meets the latency requirement in the SLA for the application. In a further embodiment, the application may be executed at the UE to minimize latency.

Figure 2H:
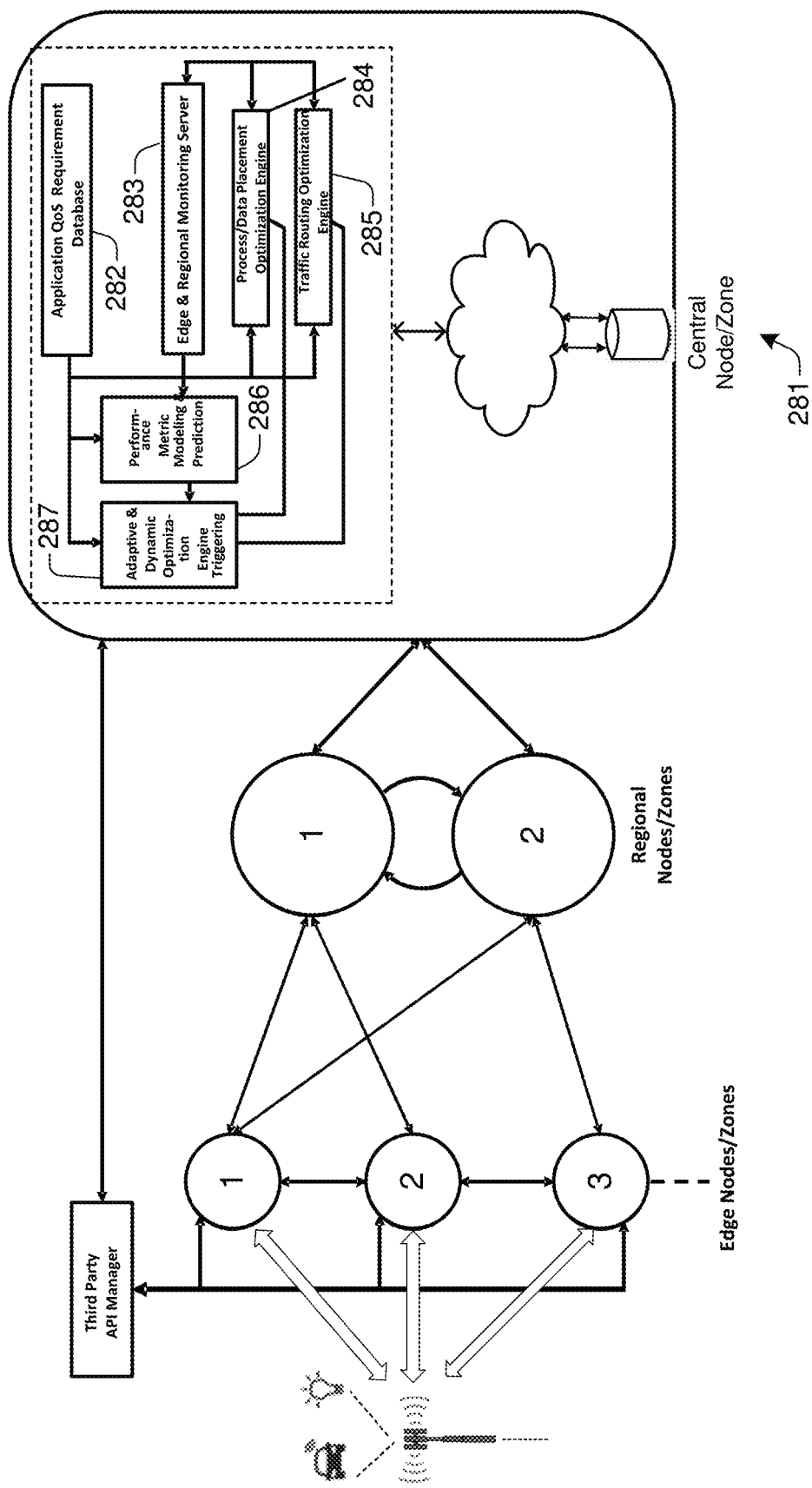
FIG. 2H schematically illustrates an architecture for dynamic optimization of latency in a central network node, in accordance with an embodiment of the disclosure.

FIG. 2H is a schematic illustration 208 of dynamic optimization of latency in a central network node, in accordance with an embodiment of the disclosure. As shown in FIG. 2H, node 281 includes an API/QoS requirements database 282, an edge/regional monitoring server 283, an optimization engine 284 for placement of processes and/or data, and an optimization engine 285 for traffic routing. In this embodiment, node 281 also includes a modeling/prediction function 286 for performance metrics, and a triggering function 287 for the optimization engines.

Based on current measurements of KPIs, performance metrics (e.g. available bandwidth and latencies at various nodes) are predicted; the predicted performance metrics are analyzed and compared with applicable SLAs and QoS requirements. If the measured or predicted latency does not meet a target latency, one or more of the optimization engines is triggered in an adaptive process. In this embodiment, optimization triggering is performed dynamically, in response to the analysis of changing KPIs. If the target latency cannot be achieved after the optimization procedure (or a specified number of optimization procedures), a report is transmitted to a network administrator.

Figure 2I:
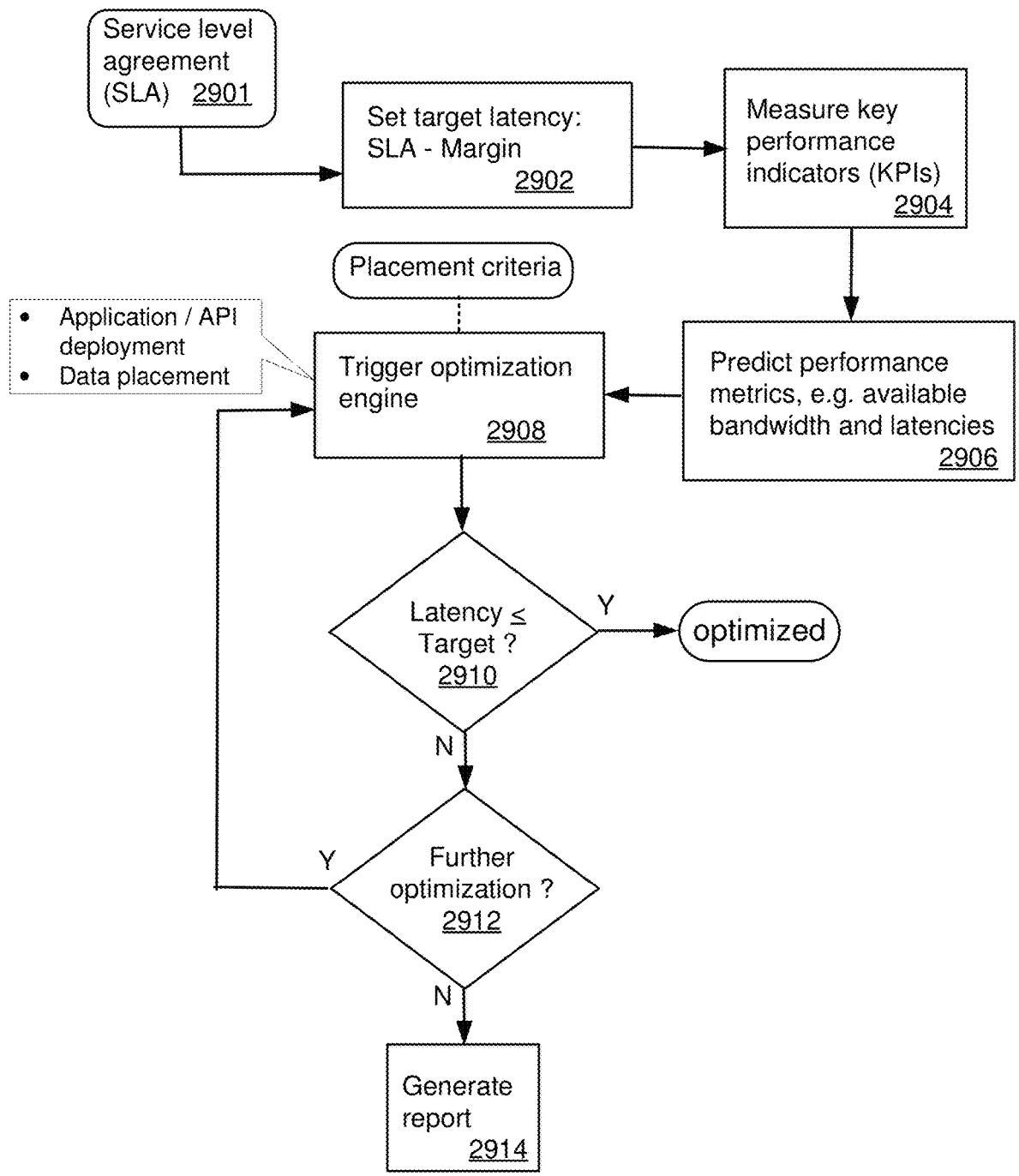
FIG. 2I is a flowchart depicting an illustrative embodiment of a method for optimizing latency in a central network node, in accordance with various aspects described herein.

FIG. 2I is a flowchart 209 depicting an illustrative embodiment of a method, performed at a central network node, for optimizing latency in accordance with an embodiment of the disclosure. In step 2902, a target latency is calculated, based on an applicable service level agreement (SLA) 2901 and a predetermined margin; the target may thus be expressed as (SLA—Margin). Key performance indicators (KPIs) for the network are measured (step 2904) and performance metrics are predicted based on the measurements (step 2906). Optimization engine(s) for process or base API placement, data placement, and/or traffic routing are then triggered (step 2908). If the latency does not meet the target (step 2910), the optimization procedure may be repeated (step 2912); in an embodiment, optimization may be repeated a specified number of times. If the latency target is not met after optimization, a report is generated (step 2914).

Optimization to minimize latency for an application may be performed with respect to data placement, base API placement, or both.

Optimization is performed with respect to data placement when the locations of the application or base APIs are known. For example, a base API may be known to be performed (or required to be performed) at a particular node (that is, a fog node, regional node, or central node) based on computational complexity of the base API and/or available computational resources at a given node.

Optimization is performed with respect to API placement when the data locations are known. For example, a data object may be known to be stored (or required to be stored) at a particular location (that is, a fog node, regional node, or central node) based on the size of the data object and available storage at a given node.

More generally, applications/APIs and data are deployed on the network to minimize latencies of the applications/APIs, subject to various criteria including (1) resources used by the applications (e.g. bandwidth and/or computational resources) and (2) a target latency reflecting requirements based on a SLA. Furthermore, the network may be optimized with respect to a KPI in addition to, or instead of, the latency.

Figure 2J:
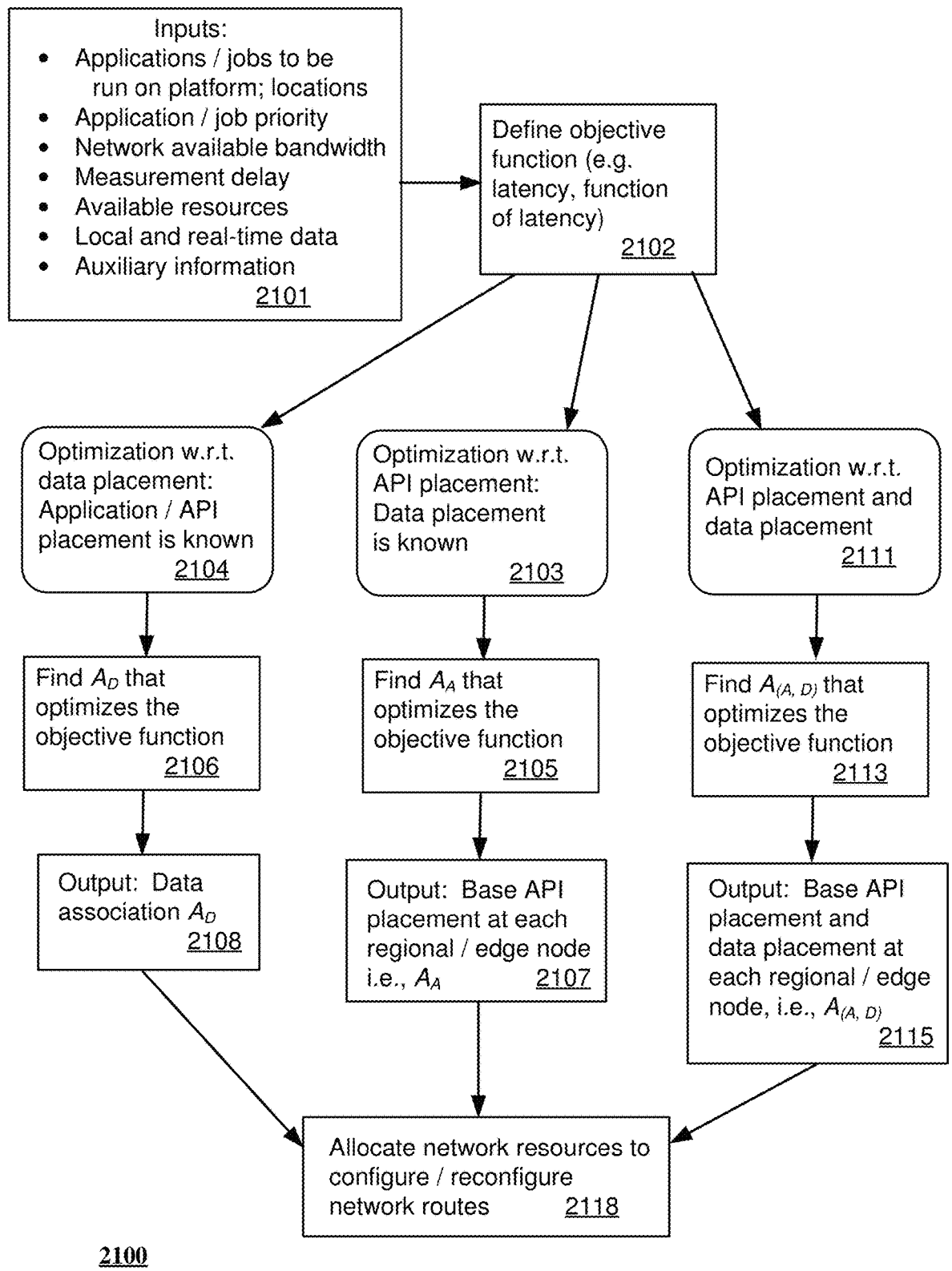
FIG. 2J is a flowchart depicting an illustrative embodiment of a method for optimizing latency with respect to data placement and/or API placement in a network, in accordance with various aspects described herein.

FIG. 2J is a flowchart 2100 depicting an illustrative embodiment of a method for optimizing latency with respect to data placement and/or API placement in a network, in accordance with various aspects described herein.

In an embodiment, inputs 2101 to an optimization engine can include: (1) identifiers and locations of applications and jobs to be run; (2) priority of the application; (3) available bandwidth; (4) measurement delay; (5) available computational and storage resources; (6) local and real-time data relating to particular nodes; (7) auxiliary information, including information from sources outside the network, e.g. public websites and social networks. In step 2102, an objective function is defined that targets latency, a function of latency, or some other objective to satisfy requirements of the application (e.g. QoS requirements).

If it is determined that optimization should be performed with respect to data placement (step 2104), the optimization engine finds an allocation $A_D$ of data objects in edge, regional and central nodes to optimize the objective function (step 2106). The output $A_D$ represents an association of data objects with specific nodes (step 2108). Network resources are then allocated (step 2118) to configure or reconfigure data flow routes on the network. In an embodiment, the network routes are configured in accordance with flow rules applied across the network.

In a further embodiment, a heuristic optimization procedure may be performed with respect to data placement, for one or more applications. The applications are sorted in increasing order of latency requirements, and the data objects are sorted in decreasing order of update frequency.

Each successive data object is then placed so as to meet the objective function for all base APIs that require that data object.

If it is determined that optimization should be performed with respect to API placement (step 2103), the optimization engine finds a partitioning AA of base APIs in edge, regional and central nodes to optimize the objective function (step 2105). The output AA represents an association of the base APIs with specific nodes (step 2107). Network resources are then allocated (step 2118) to configure or reconfigure data flow routes on the network.

In a further embodiment, a heuristic optimization procedure may be performed with respect to API placement, for one or more applications. The applications are sorted in increasing order of latency requirements; each application is then decomposed into base APIs as specified in the API database. The base APIs are sorted into a sequential dependency using a topological sort. Each successive sorted base API is then placed so as to meet the objective function for all data objects accessed by that base API.

If it is determined that optimization should be performed with respect to both API placement and data placement (step 2111), the optimization engine finds an allocation $A_{(A,D)}$ of the data objects and base APIs in edge, regional and central nodes to optimize the objective function (step 2113). The output $A_{(A,D)}$ represents an association of the base APIs and data objects with specific nodes (step 2115). Network resources are then allocated (step 2118) to configure or reconfigure data flow routes on the network.

In a further embodiment, a heuristic optimization procedure may be performed with respect to API placement and data placement, for one or more applications. The applications are sorted in increasing order of latency requirements. For each application, an iterative optimization is performed in which base API partitioning and placement are optimized assuming an initial data placement, data placement is then optimized assuming the initial base API placement result, and so on with data placement and API placement optimization performed alternately. The iteration can be terminated after a predetermined number of steps, or when it is found that the data placement and base API placement are not modified relative to the previous iteration.

The data placement optimization and base API placement optimization may be formulated and solved using various techniques including integer/mixed-integer optimization, constrained optimization, heuristic optimization, etc.

While for purposes of simplicity of explanation, the respective processes are shown and described as a series of blocks in FIGS. 2I and 2J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of network 201, and methods 209, 2100 presented in FIGS. 1, 2A, 2I, 2J, and 3. For example, virtualized communication network 300 can facilitate in whole or in part procedures for reducing latency including placement of data objects and/or base APIs at edge nodes, regional nodes, or central nodes of a network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
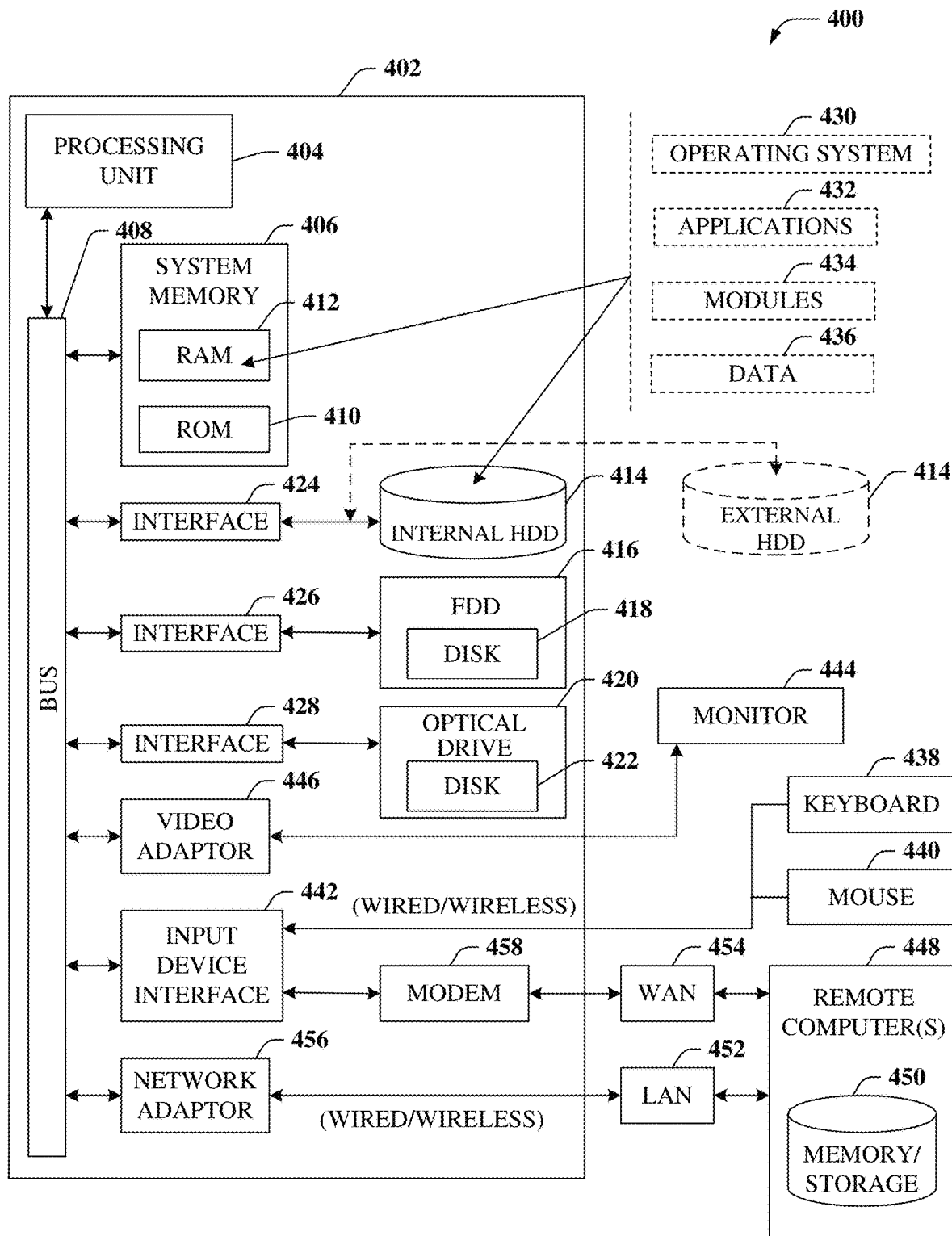
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part dynamically assigning resources for data processing so that a latency associated therewith meets a latency criterion; the resources can comprise computation resources and storage resources of one or more of a network edge node, a regional node of a plurality of regional nodes in communication with the edge node and a central node, and the central node.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
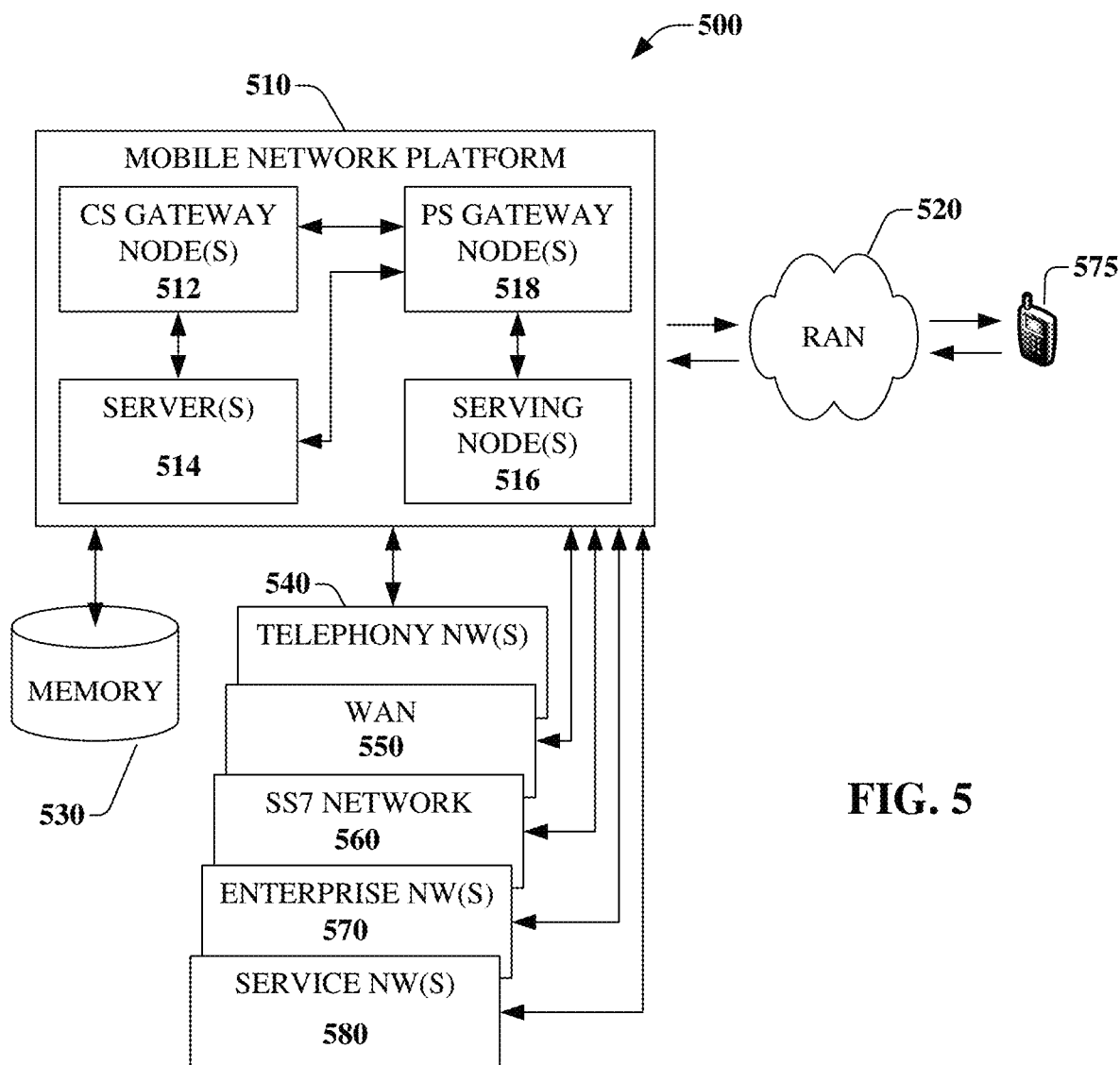
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving data at an edge node of a network that also includes regional nodes and central nodes, and determining a latency criterion associated with an application for processing the data, where the application corresponds to an application programming interface (API) included in a database accessible to a central node. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
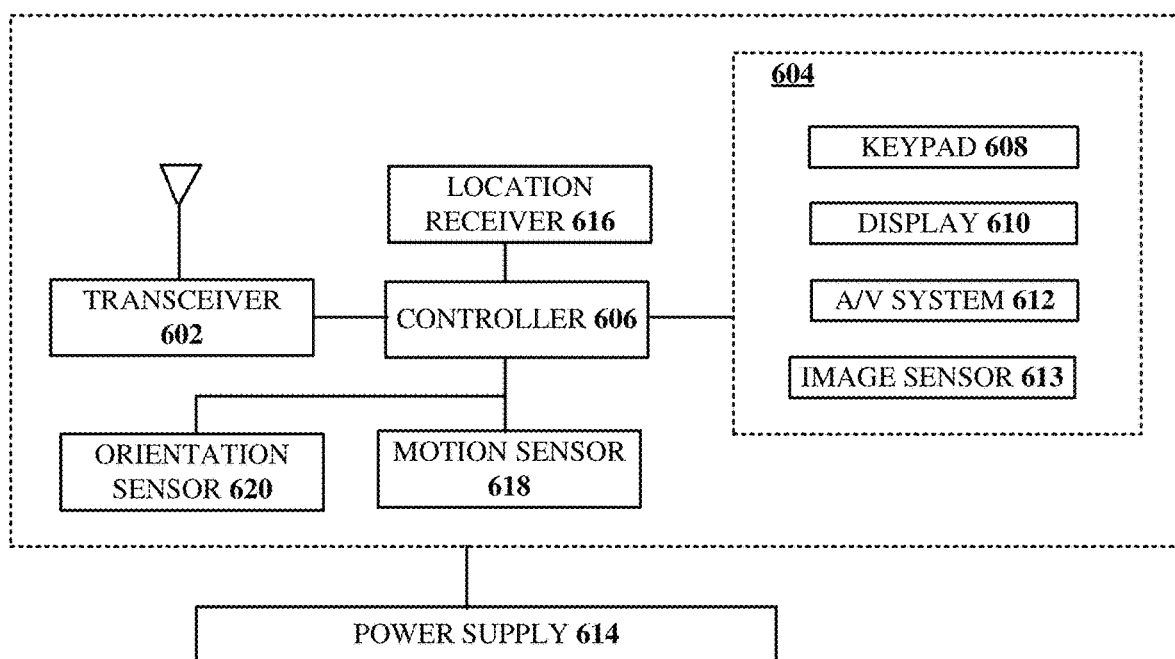
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving data at an edge node of a network that also includes regional nodes and central nodes, and determining a latency criterion associated with an application for processing the data, where the application corresponds to an application programming interface (API) included in a database accessible to a central node.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600.

In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:
   receiving, by a processing system including a processor, data at an edge node of a plurality of edge nodes of a network, the network further comprising a plurality of regional nodes and a plurality of central nodes;
   determining, by the processing system, a latency criterion associated with an application for processing the data, the application utilizing an application programming interface (API), information regarding the API being stored in a database accessible to at least one of the edge node, a regional node of the plurality of regional nodes in communication with the edge node, and a central node of the plurality of central nodes in communication with the regional node;
   monitoring, by the processing system, a latency associated with the processing of the data by the application;
   determining, by the processing system, whether the latency satisfies the latency criterion;
   responsive to the latency satisfying the latency criterion, assigning, by the processing system, resources to assist the application in reducing the latency associated with the processing of the data, the resources comprising computation resources, storage resources, network resources, or a combination thereof obtained from the central node, the regional node, the edge node, or any combination thereof
   partitioning, by the processing system, the API into a plurality of base APIs including a first base API and a second base API, wherein the first base API has associated therewith a first latency less than a second latency associated with the second base API; and
   assigning, by the processing system, the edge node to the first base API and the regional node to the second base API.

2. The method of claim 1, wherein the API is accessible to a third party.

3. The method of claim 1, further comprising: by the processing system, measuring a key performance indicator (KPI) of the network, accessing the KPI, or both; and predicting, by the processing system, a network performance metric based on the KPI.

4. The method of claim 1, wherein the API comprises a plurality of base APIs, and wherein the database comprises a list of data objects to be accessed via the respective base APIs.

5. The method of claim 4, further comprising triggering, by the processing system, a procedure for reducing the latency comprising placement of the data objects at one or more of the edge node, the regional node, and the central node.

6. The method of claim 4, further comprising triggering, by the processing system, a procedure for reducing the latency comprising placement of the base APIs at one or more of the edge node, the regional node, and the central node.

7. The method of claim 4, further comprising triggering, by the processing system, an iterative procedure for reducing the latency comprising placement of the data objects and the base APIs at one or more of the edge node, the regional node, and the central node.

8. The method of claim 1, wherein the data is streamed from the edge node to the regional node for processing at the regional node.

9. The method of claim 1, wherein the received data is accessible to a third party from the edge node, the regional node, the central node or a combination thereof.

10. A device comprising:
    a processing system including a processor; and
    a memory that stores executable instructions that, when executed by the processing system, facilitate performance of operations comprising:
    receiving data at an edge node of a plurality of edge nodes of a network, the network further comprising a plurality of regional nodes and a plurality of central nodes;
    determining a latency criterion associated with an application for processing the data, the application utilizing an application programming interface (API), information regarding the API being stored in a database accessible to at least one of the edge node, a regional node of the plurality of regional nodes in communication with the edge node, and a central node of the plurality of central nodes in communication with the regional node;
    measuring a key performance indicator (KPI) of the network;
    monitoring a latency associated with the processing of the data by the application;
    determining whether the latency satisfies the latency criterion;
    responsive to the latency satisfying the latency criterion, assigning resources to assist the application in reducing the latency associated with the processing of the data, the resources comprising computation resources, storage resources, network resources, or a combination thereof obtained from the central node, the regional node, the edge node, or any combination thereof partitioning the API into a plurality of base APIs including a first base API and a second base API, wherein the first base API has associated therewith a first latency less than a second latency associated with the second base API; and assigning the edge node to the first base API and the regional node to the second base API.

11. The device of claim 10, wherein the operations further comprise predicting the latency based on the KPI.

12. The device of claim 10, wherein the API comprises a plurality of base APIs, and wherein the database comprises a list of data objects to be accessed via the respective base APIs.

13. The device of claim 12, wherein the operations further comprise triggering a procedure for reducing the latency comprising placement of the data objects at one or more of the edge node, the regional node, and the central node.

14. The device of claim 12, wherein the operations further comprise triggering a procedure for reducing the latency comprising placement of the base APIs at one or more of the edge node, the regional node, and the central node.

15. A non-transitory, machine-readable medium comprising executable instructions that, when executed by a processing system including a processor, facilitate performance of operations comprising:

receiving data at an edge node of a plurality of edge nodes of a network, the network further comprising a plurality of regional nodes and a plurality of central nodes;

determining a latency criterion associated with an application for processing the data, the application utilizing an application programming interface (API), information regarding the API being stored in a database accessible to at least one of the edge node, a regional node of the plurality of regional nodes in communication with the edge node and a central node of the plurality of central nodes in communication with the regional node, the API comprising a plurality of base APIs, the database comprising a list of data objects to be accessed via the respective base APIs;

monitoring a latency associated with the processing of the data by the application;

determining whether the latency satisfies the latency criterion; and responsive to the latency satisfying the latency criterion, assigning resources to assist the application in reducing the latency associated with the processing of the data, the resources comprising computation resources, storage resources, network resources, or a combination thereof obtained from the central node, the regional node, the edge node, or any combination thereof; and triggering a procedure for reducing the latency comprising placement of the data objects at one or more of the edge node, the regional node, and the central node.

16. The non-transitory, machine-readable medium of claim 15, wherein the operations further comprise triggering a procedure for reducing the latency comprising placement of the base APIs at one or more of the edge node, the regional node, and the central node.

17. The non-transitory, machine-readable medium of claim 15, wherein the operations further comprise triggering an iterative procedure for reducing the latency comprising placement of the data objects and the base APIs at one or more of the edge node, the regional node, and the central node.

18. The non-transitory, machine-readable medium of claim 15, wherein the operations further comprise measuring a key performance indicator (KPI) of the network, and predicting the latency based on the KPI.

19. The non-transitory, machine-readable medium of claim 15, wherein the data is streamed from the edge node to the regional node for processing at the regional node.

20. The non-transitory, machine-readable medium of claim 15, wherein the received data is accessible to a third party from the edge node, the regional node, the central node or a combination thereof.

* * * * *